(12) United States Patent
Sousek et al.

(10) Patent No.: US 10,761,254 B2
(45) Date of Patent: Sep. 1, 2020

(54) LIGHT-GUIDING OPTICAL SYSTEM

(71) Applicant: Varroc Lighting Systems, s.r.o., Senov u Noveho Jicina (CZ)

(72) Inventors: Pavel Sousek, Novy Jicin (CZ); Tomas Socha, Namestovo (SK)

(73) Assignee: Varroc Lighting Systems, S.R.O., Senov u Noveho (CZ)

( * ) Notice: Subject to any disclaimer, the term of this patent is extended or adjusted under 35 U.S.C. 154(b) by 39 days.

(21) Appl. No.: 16/006,182

(22) Filed: Jun. 12, 2018

(65) Prior Publication Data
US 2018/0356582 A1 Dec. 13, 2018

(30) Foreign Application Priority Data
Jun. 13, 2017 (CZ) .................................... 2017-338

(51) Int. Cl.
*F21V 7/04* (2006.01)
*F21V 8/00* (2006.01)
(Continued)

(52) U.S. Cl.
CPC .......... *G02B 6/0018* (2013.01); *F21S 41/148* (2018.01); *F21S 41/24* (2018.01);
(Continued)

(58) Field of Classification Search
CPC ...... G02B 6/0013; F21S 41/24; F21S 43/239; F21S 43/241; B60Q 3/62; B60Q 1/0011
See application file for complete search history.

(56) References Cited

U.S. PATENT DOCUMENTS 6,712,481 B2 * 3/2004 Parker .................. A61M 21/02
362/330
7,401,948 B2 7/2008 Chinniah et al.
(Continued)

FOREIGN PATENT DOCUMENTS

CZ 20050096 A3 10/2006
EP 3176500 A1 6/2017
(Continued)

OTHER PUBLICATIONS

Search Report from Corresponding Czech Application No. PV 2017-338 dated Feb. 22, 2018 (3 pages).

*Primary Examiner* — William J Carter
*Assistant Examiner* — Omar Rojas Cadima
(74) *Attorney, Agent, or Firm* — Hovey Williams LLP

(57) ABSTRACT

The light-guiding optical system comprises at least one light guide (1) made from an optically transparent material with an associated collimating element (2), and a light unit (3) to emit light rays (10) into the collimating element (2). The light guide (1) comprises on its front side an output surface (12) for the output of light rays (10) conducted by the light guide (1) out of the light guide (1), and on its bottom or top side, a binding surface (11) to bind light rays (10) collimated by the collimating element (2) into the light guide (1). The light guide (1) further comprises at least one reflective means (4) to produce light patterns (A, B, C) on the output surface (12) that comprises surfaces (41, 42, 43) configured for total reflection of at least a part of the light rays (10) falling onto them, a part of the light rays (10) reflected this way being directed by the reflective means (4) towards the lateral surfaces (15) and the remaining part being directed straight to the output surface (12) of the light guide (1). The reflective means (4) of the light guide (1) comprises two lateral reflective surfaces (41, 43) opening from a common contact edge (44) and configured for total reflection of the (Continued)

Figure 1:
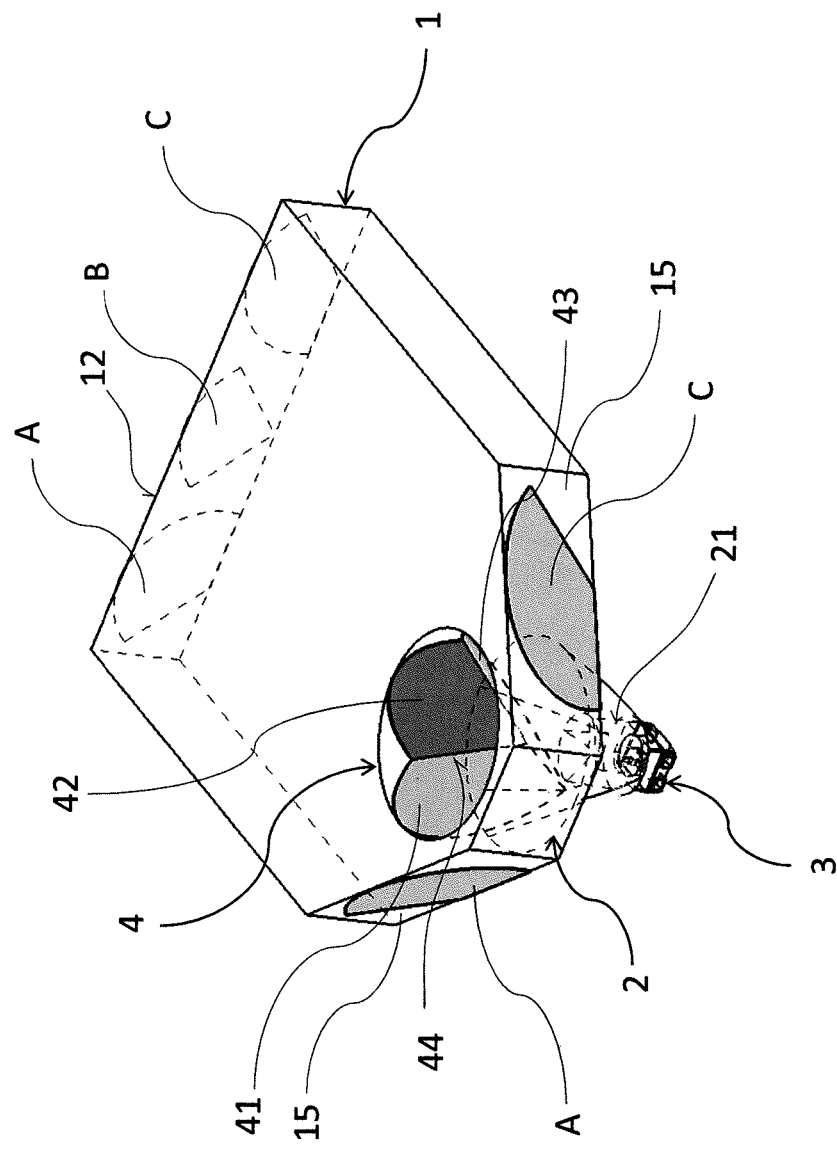

incident light rays towards the lateral surfaces (15), and one central surface (42) comprising one or more central reflective surfaces (42'), the central surface (42) touching each of the lateral reflective surfaces (41, 43) at one point at the most.

21 Claims, 18 Drawing Sheets

(51) Int. Cl.

| | | |
|---|---|---|
| *F21S 41/32* | (2018.01) | |
| *F21S 43/247* | (2018.01) | |
| *F21S 43/40* | (2018.01) | |
| *F21S 41/20* | (2018.01) | |
| *F21S 43/243* | (2018.01) | |
| *F21S 43/14* | (2018.01) | |
| *F21S 41/148* | (2018.01) | |
| *F21S 43/31* | (2018.01) | |
| *F21S 41/24* | (2018.01) | |
| *F21S 43/239* | (2018.01) | |

(52) U.S. Cl.
CPC ........... *F21S 41/285* (2018.01); *F21S 41/322* (2018.01); *F21S 43/14* (2018.01); *F21S 43/239* (2018.01); *F21S 43/243* (2018.01); *F21S 43/247* (2018.01); *F21S 43/315* (2018.01); *F21S 43/40* (2018.01); *G02B 6/002* (2013.01); *G02B 6/0078* (2013.01)

(56) References Cited

U.S. PATENT DOCUMENTS

| | | | |
|---|---|---|---|
| 8,684,575 B2 | 4/2014 | Mitsuhashi et al. | |
| 9,458,986 B2 | 10/2016 | Kono | |
| 2006/0164839 A1* | 7/2006 | Stefanov | G02B 6/0018 362/327 |
| 2006/0274621 A1* | 12/2006 | Nagabuchi | G02B 6/0018 369/53.36 |
| 2007/0086204 A1 | 4/2007 | Chinniah et al. | |
| 2008/0074752 A1* | 3/2008 | Chaves | G02B 27/1006 359/641 |
| 2009/0231846 A1 | 9/2009 | Nakajima | |
| 2012/0188774 A1 | 7/2012 | Okada | |
| 2012/0218772 A1* | 8/2012 | Mitsuhashi | G02B 6/0045 362/516 |
| 2014/0029284 A1 | 1/2014 | Giraud et al. | |
| 2015/0247613 A1 | 9/2015 | Doha et al. | |
| 2018/0038569 A1* | 2/2018 | Hanulak | F21S 43/50 |

FOREIGN PATENT DOCUMENTS

| | | |
|---|---|---|
| FR | 2966224 A1 | 4/2012 |
| JP | 6082264 B2 | 2/2017 |
| WO | 2008069143 A1 | 6/2008 |

* cited by examiner

LIGHT-GUIDING OPTICAL SYSTEM

RELATED APPLICATIONS

This application claims the priority benefit of Czech. Patent Application Serial No. PV 2017-338 entitled "A LIGHT-GUIDING OPTICAL SYSTEM," filed Jun. 13, 2017, the entire disclosure of which is incorporated herein by reference.

FIELD OF THE INVENTION

The invention relates to a light-guiding optical system that comprises a light guide and a collimating element to conduct light emitted by a light source, especially to be used for a light device of a vehicle.

BACKGROUND INFORMATION

A common drawback of known light guides used for light devices of motor vehicles is the fact that a certain part of the light emitted by the light sources is not used or that the required shape of the output surface of the light guide does not support efficient use of the emitted light, which reduces the light efficiency of the light guide. In the field of the design of light guides and light-guiding systems, there is a permanent effort to propose such designs that will bring an increase of their light efficiency and ensure homogeneity of the output light beam.

The documents U.S. Pat. No. 7,401,948B2 and WO2008069143A1 disclose collimating elements that comprise a central recess for efficient binding of light rays from the light source to the body of the collimating element. In principle, in one recess of a collimating element just one LED light source can be used. The body of these collimating elements comprises a central lens to direct emitted light rays in a straight direction as well as lateral segments to direct emitted light rays in an indirect direction. The lateral segments disclosed in the document U.S. Pat. No. 7,401,948B2 comprise entry surfaces through which light rays enter the body of the collimating element as well as inner reflective surfaces configured for total reflection of bound light rays and their emission to the desired direction. Rotary light-guiding and collimating bodies are able to create especially light patterns in the shape of a circle, in the case of a certain spatial deformation of the rotary body then in the shape of an ellipse. If several collimating elements send light into a planarly shaped light guide, on the output surface of this light guide, an array of circles/ellipses situated next to each other, inscribed in the shape of the desired output surface. A disadvantage of this design consists in the necessity to use a relatively high number of light sources if the desired shape is a thin continuous band/stripe. This is because a high number of light sources entails increased requirements for the electronic equipment of the light device, and thus increased production costs of the light device. The quantity of light sources can be eliminated through an adaptation of the design of the optical concept, wherein conversely, a part of the output light band is inscribed in the respective circle of the collimating elements. In this case, however, not all the light emitted by the light sources can be effectively used.

Examples of known designs of a light guide striving to increase the light efficiency are the solutions described in the documents JP06082264B2 and CZ20050096A3. These solutions are based on using configured reflective surfaces for total reflection of light rays and sending them to the required direction. However, a disadvantage of this solution is that efficient use of light emitted by the light sources is not made possible because maximum binding of light rays emitted by the light source is not enabled. Another disadvantage is the shape of the light guide, which is not adaptable to the mechanical design of the light device.

From the documents FR2966224A1 and US20150247613A1, lighting and/or signaling devices for a motor vehicle are known that comprise a light source and a light-guiding plate that has a surface for the entry of light rays and an output edge/surface and is configured to spread light rays towards the output surface. The light-guiding plate comprises a collimator with a surface for the entry of light rays emitted by the light source and with a transitional surface for the output of the collimated light beam from the collimator into the body of the light-guiding plate, this collimator being positioned with respect to the plate in such a way for the axis of the collimated beam to be oriented in the thickness direction of this plate, preferably in the vertical direction. The light-guiding plate comprises reflective means which light rays from the transitional surface of the collimators are sent to. The reflective means is designed as an array of reflective surfaces configured to direct rays of the collimated beam towards the output surface, i.e. to deflect light rays from the vertical plane to the horizontal plane. The reflective means is designed as an array of at least three reflective surfaces wherein a part of light rays is directly sent to the output surface, another part of light rays being routed to the output surface indirectly. Light rays are first directed from the reflective surfaces towards the lateral edges of the light-guiding plate where reflective surfaces adapted to direct light rays towards the output surface of the light-guiding plate are situated. The first disadvantage od this solution is uneven distribution of light intensity on the output surface of the light-guiding plate as at least two reflective surfaces of the reflective means have a common edge in each case, i.e. they are not spatially offset, i.e. they have a constant shape of a sector of a circle, and on the output surface, patterns are projected in the form of discontinuous regions with an unsymmetrical shape that do not respect the shape of the output surface. Thus, the light guide can only project light patterns having the shape of a sector of a circle or a shape similar to a sector of a circle through its output surface. Another disadvantage is that the size of the reflective surfaces of the reflective means cannot be changed to adapt the optical concept to the mechanical design of the lighting device. The third disadvantage is the fact that the ratio of the width to the thickness of the light guide is fixed and the shape of the collimator determines the shape of the reflective means and thus the shape of projected patterns on the output surface, which makes redistribution of the intensity of light emitted from individual reflective surfaces of the reflective means through the reflective means impossible.

The object of the invention is to solve the issue of increasing the light efficiency of collimating elements connected to a planarly shaped light guide without a large number of light sources having to be used to ensure the required light characteristic. Therefore, the task of the invention is to propose a light-guiding optical system that makes it possible to fulfill the required light function, including high light efficiency and even distribution of the light intensity on the output surface with the use of a relatively low number of light sources. Another object is to make sure that the light-conductive system is adaptable to requirements resulting from the mechanical and optical design of the lighting device.

SUMMARY OF THE INVENTION

The above-mentioned objects of the invention are fulfilled by a light-guiding optical system comprising at least one light guide made from an optically transparent material with an associated collimating element, and a light unit to emit light rays into the collimating element wherein the light guide comprises on its front side an output surface for the output of light rays conducted by the light guide out of the light guide, and on its bottom or top side, a binding surface to bind light rays collimated by the collimating element into the light guide, the light guide further comprising at least one reflective means to produce light patterns on the output surface that comprises surfaces configured for total reflection of at least a part of the light rays falling onto them, a part of the light rays reflected this way being directed by the reflective means towards the lateral surfaces and the remaining part being directed straight to the output surface of the light guide. The reflective means of the light guide comprises two lateral reflective surfaces opening from a common contact edge and configured for total reflection of the incident light rays towards the lateral surfaces, and one central surface comprising one or more central reflective surfaces, the central surface touching each of the lateral reflective surfaces at one point at the most.

In one of preferred embodiments, the central surface touches the lateral reflective surfaces at one common point—at the common contact point, which is the end point of the contact edge.

In another one of preferred embodiments, the central surface touches each of the lateral reflective surfaces at one separate contact point that lies on the marginal edge of each of the lateral reflective surfaces.

In another one of preferred embodiments, the central surface is not in contact with any of the lateral reflective surfaces.

The lateral reflective surfaces and/or the central reflective surfaces preferably have the shape of a quadrangle to produce quadrangular patterns on the output surface of the light guide.

In another one of preferred embodiments, the lateral reflective surfaces and/or central reflective surfaces have the shape of a rectangle to produce rectangular patterns on the output surface of the light guide.

In another one of preferred embodiments, the projection of the lateral reflective surface and the central surface onto a plane parallel to the top or bottom side of the light guide forms a full rectangle together.

In another one of preferred embodiments, the patterns projected onto the output surface of the light guide cover the whole output surface.

In another one of preferred embodiments, the lateral surfaces of the light guide comprise a stepwise arranged reflective surface configured for total reflection and directing of light rays onto the output surface in the direction of the optical axis.

In another one of preferred embodiments, luminously inactive surfaces are situated between the reflective surfaces, creating inactive, or compared to the patterns, luminously less active patterns for variable setting of the width and/or height of the light guide and/or for uniform distribution of the luminous flux among individual patterns on the output surface.

In another one of preferred embodiments, the central surface comprises at least one inactive surface for variable setting of the length of lateral reflective surfaces and the length of the central surface and/or a change of the length based on the height of the light guide for even division of the luminous flux among individual patterns in the output surface.

The central surface preferably comprises at least two reflective surfaces while an inactive surface is located between each adjacent pair of reflective surfaces.

The output surface of the light guide is preferably fitted with optical elements for diffusion of light rays exiting from the light guide from the x axis.

The light guide and the collimating element preferably form an integral body.

In another preferred embodiment, the light guide and the collimating element are individual, spatially separated bodies.

In another one of preferred embodiments, the collimating element is a reflector.

In another one of preferred embodiments, the reflective means is symmetrical with respect to the plane perpendicular to the top or bottom side of the light guide and comprising a contact edge.

In another one of preferred embodiments, the entire light guide is symmetrical with respect to the plane perpendicular to the top or bottom side of the light guide and comprising a contact edge.

In another one of preferred embodiment, the lateral reflective surfaces and planes which the reflective surfaces lie on make the angle of 45° with the bottom and top side of the light guide and the collimated light rays exiting from the collimating element also fall onto the lateral reflective surfaces and reflective surfaces under the angle of 45°.

In another one of preferred embodiments, the light-guiding optical system comprises at least two light guides situated next to each other, produced together as one integral molding to create a continuous composite output surface comprising the output surfaces of individual light guides positioned next to each other, for the output of light rays from the light-guiding optical system.

The reflective surface advantageously comprises at least one diffusion element for partial overlapping of individual patterns on the output surface of the light guide and/or to eliminate an inactive pattern on the output surface of the light guide.

The central reflective surface advantageously comprises at least one diffusion element for partial overlapping of individual patterns on the output surface of the light guide and/or to eliminate an inactive pattern on the output surface of the light guide.

CLARIFICATION OF DRAWINGS

Figure 2:
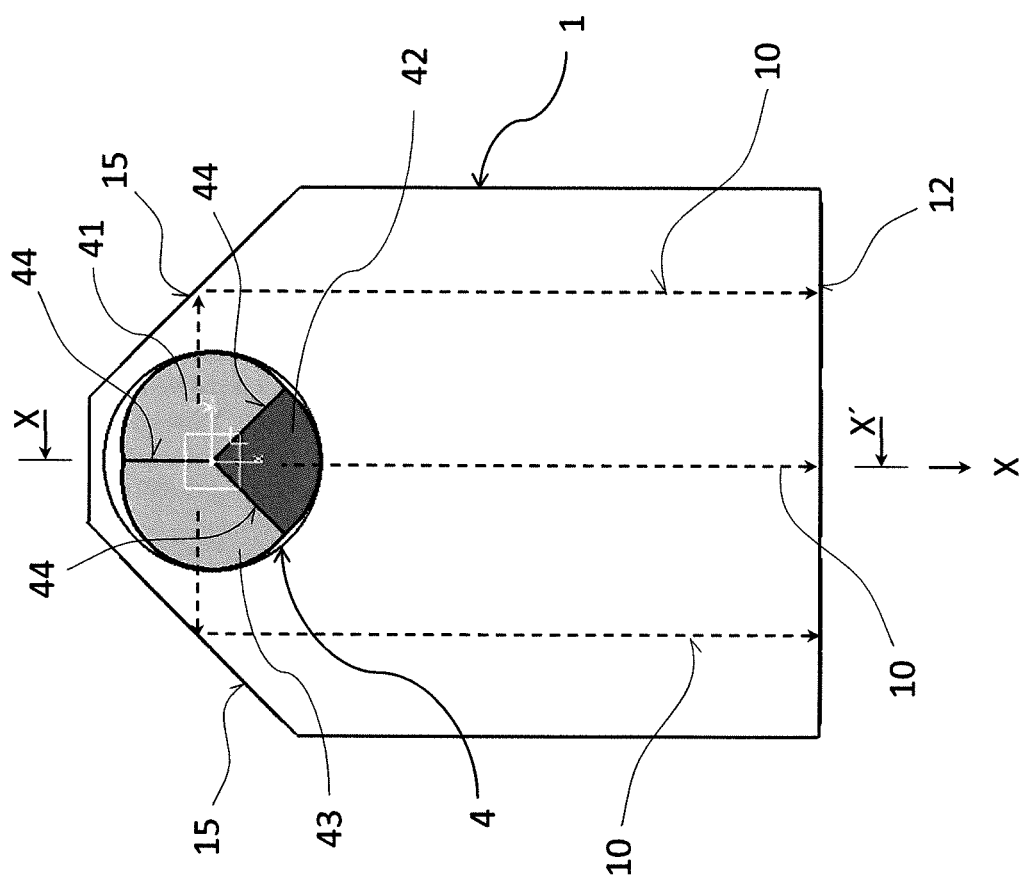
Figure 3:
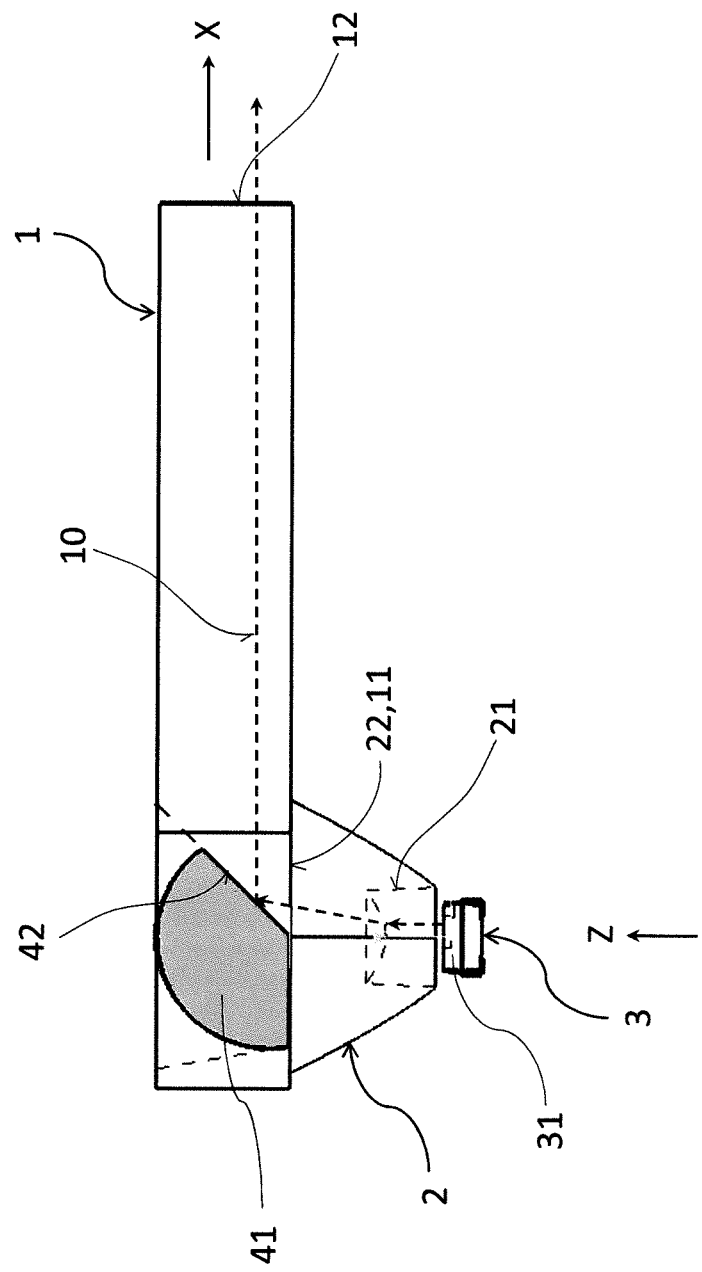
Figure 4:
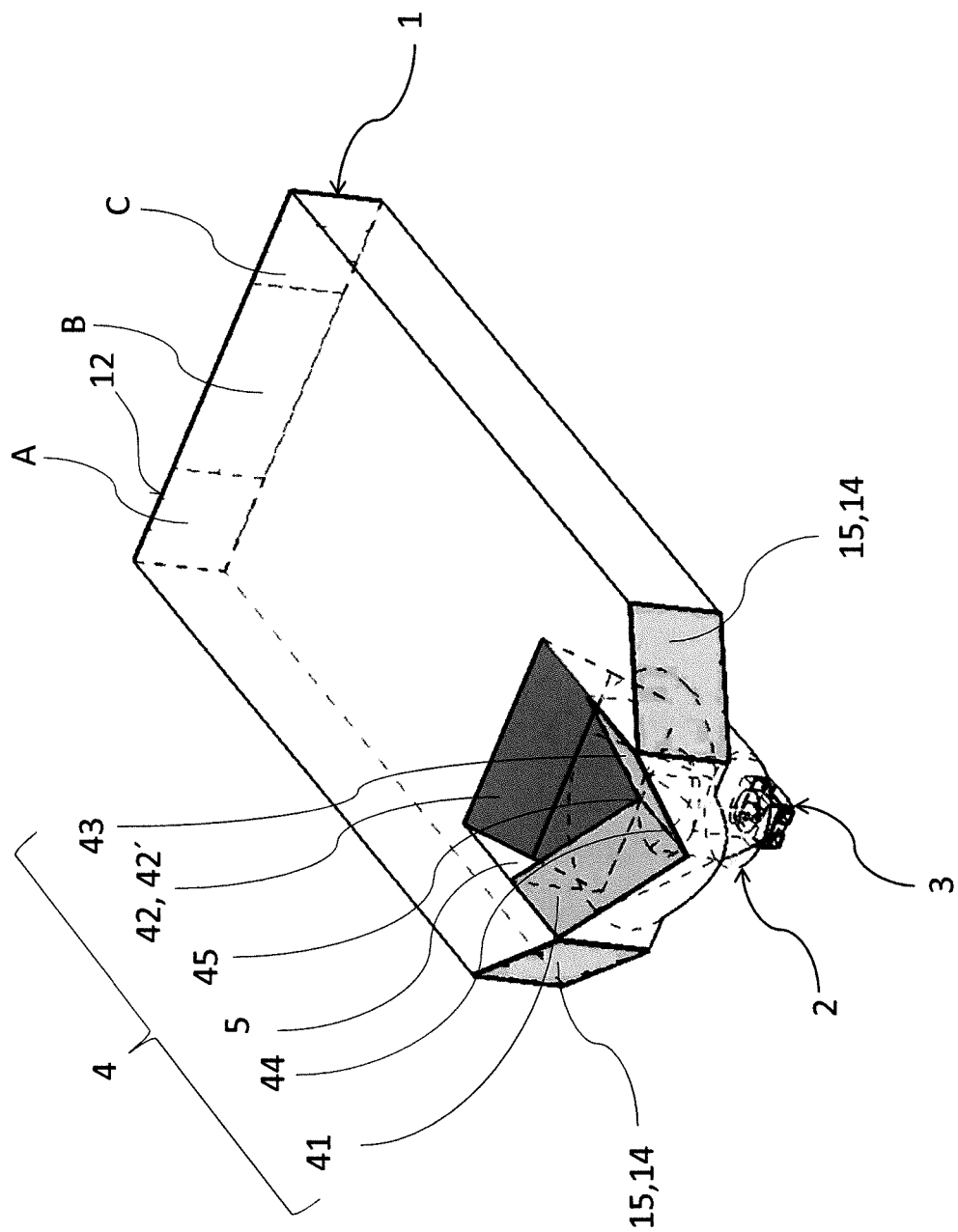
Figure 5:
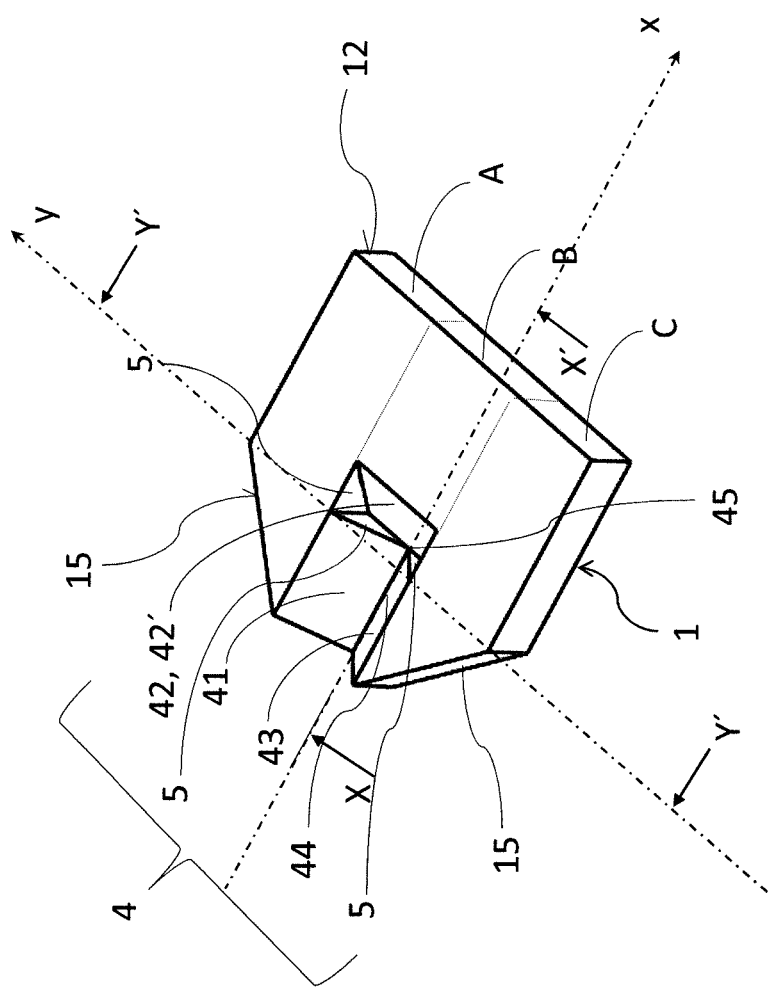
Figure 6:
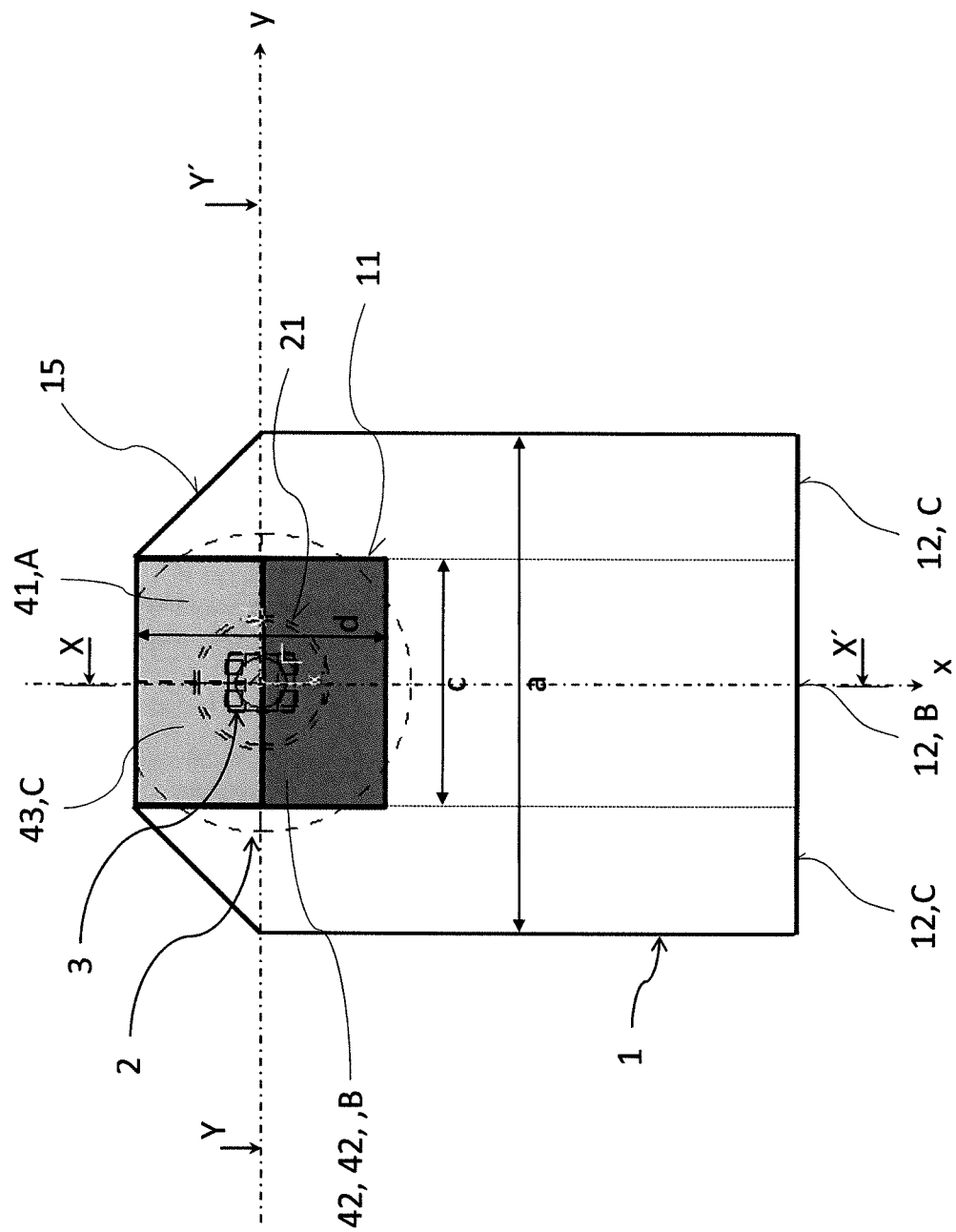
Figure 7:
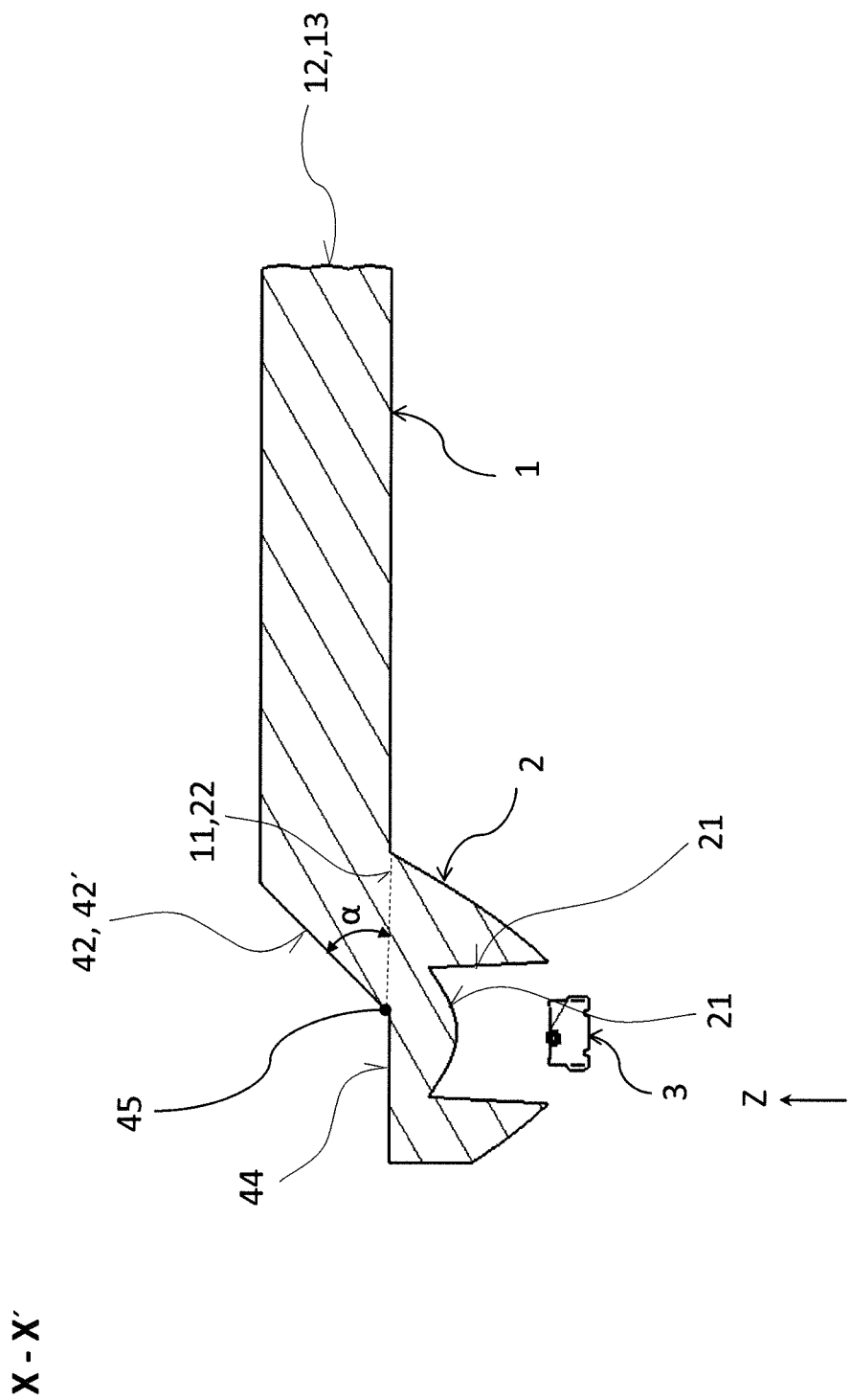
Figure 8:
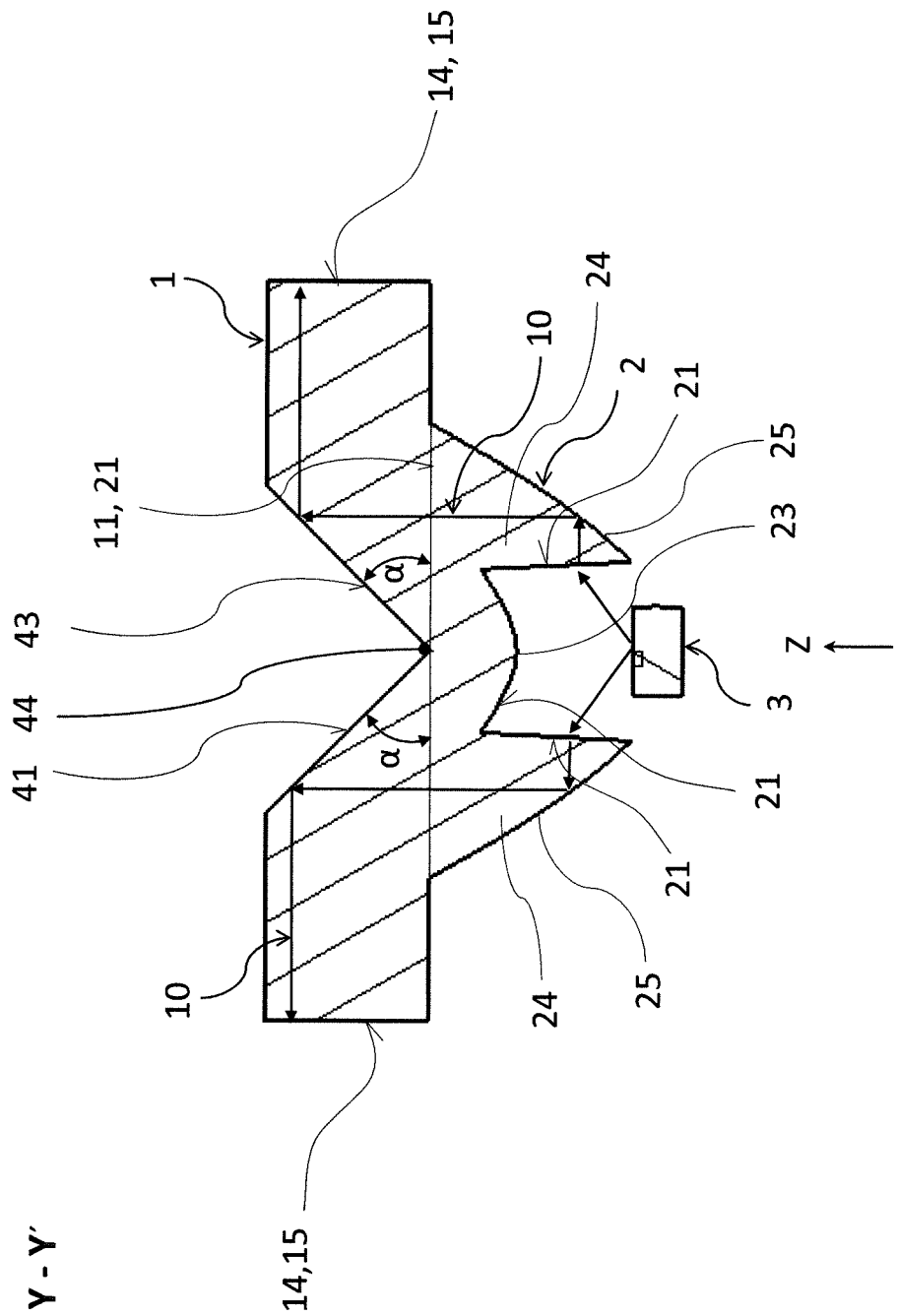
Figure 9:
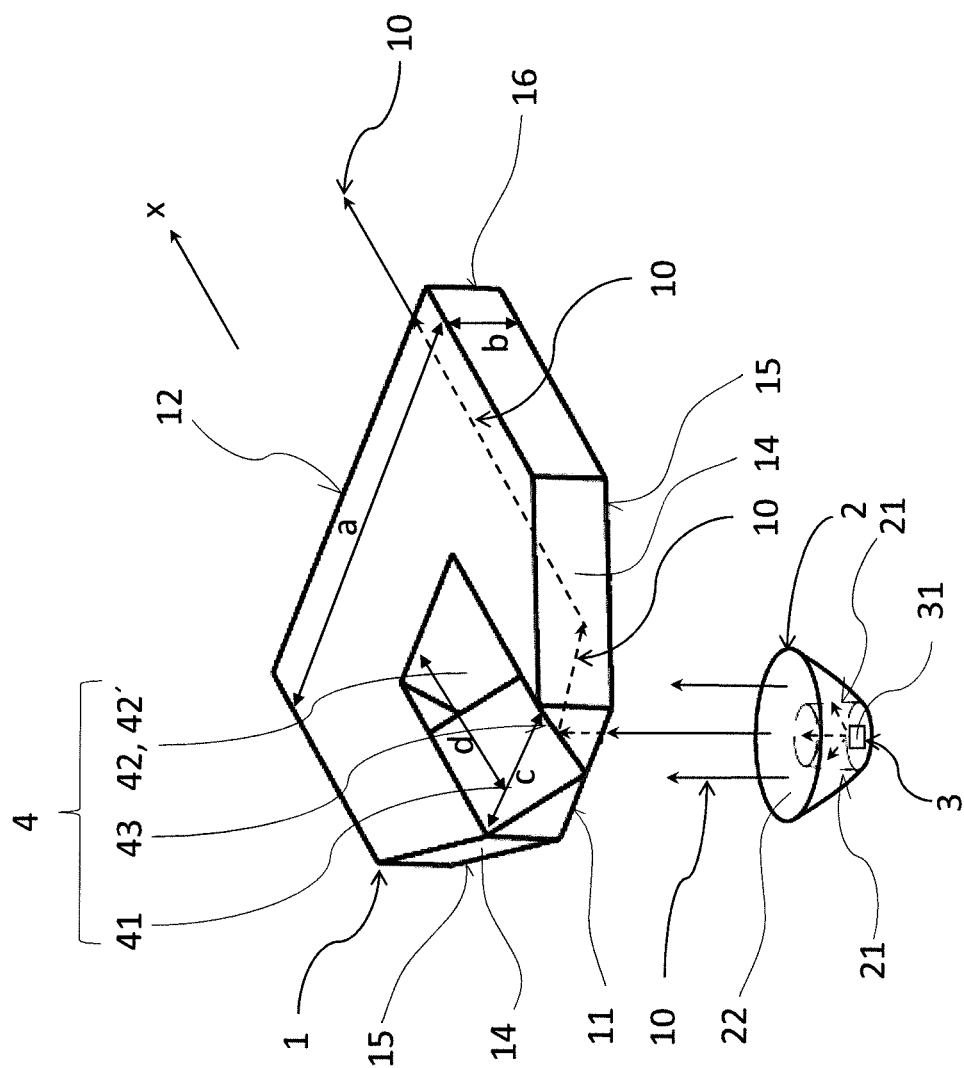
Figure 10:
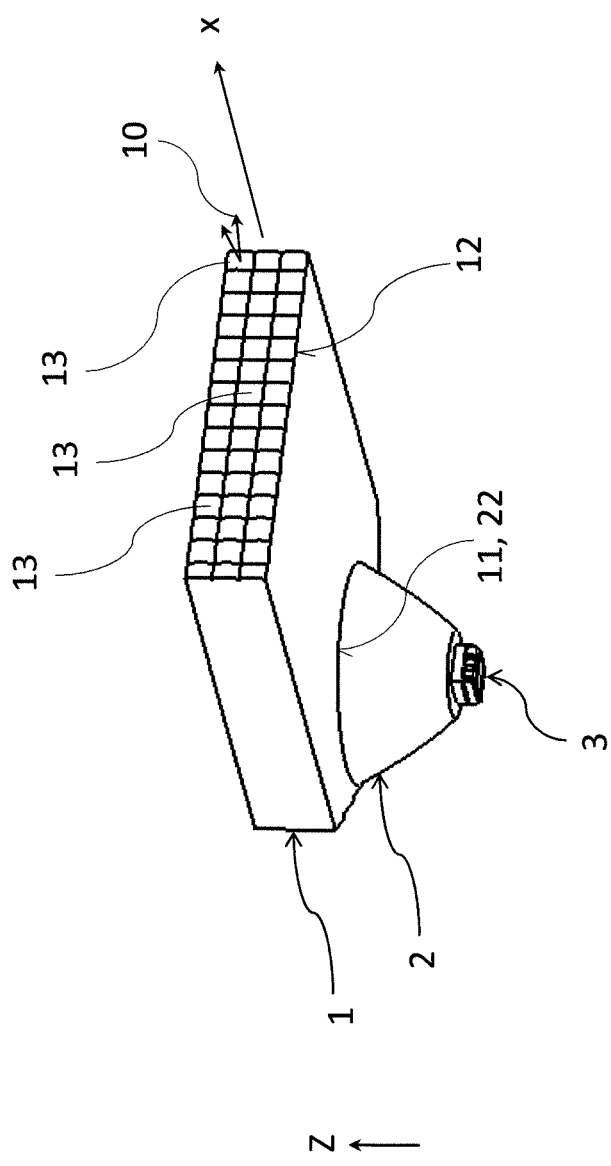
Figure 11:
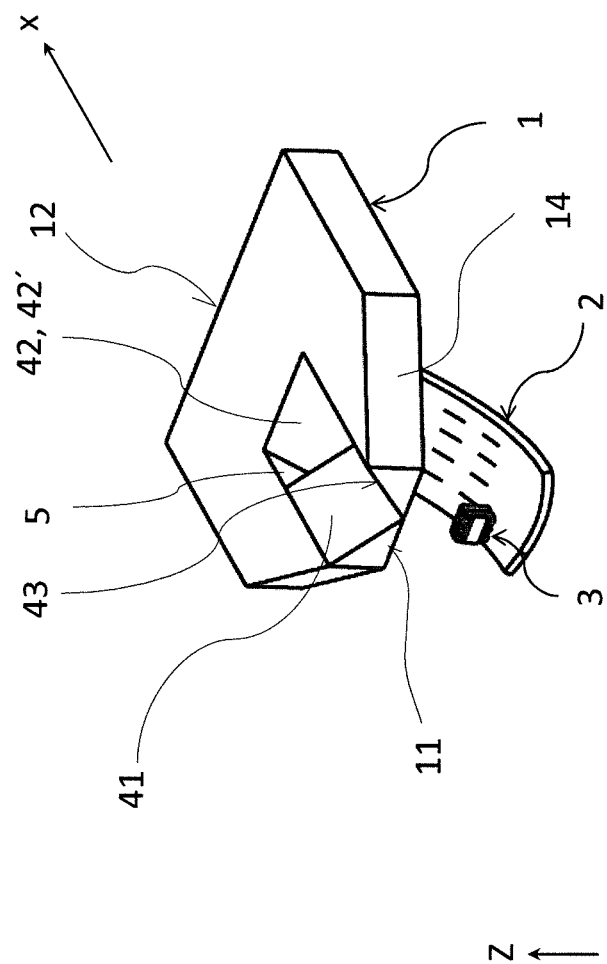
Figure 12:
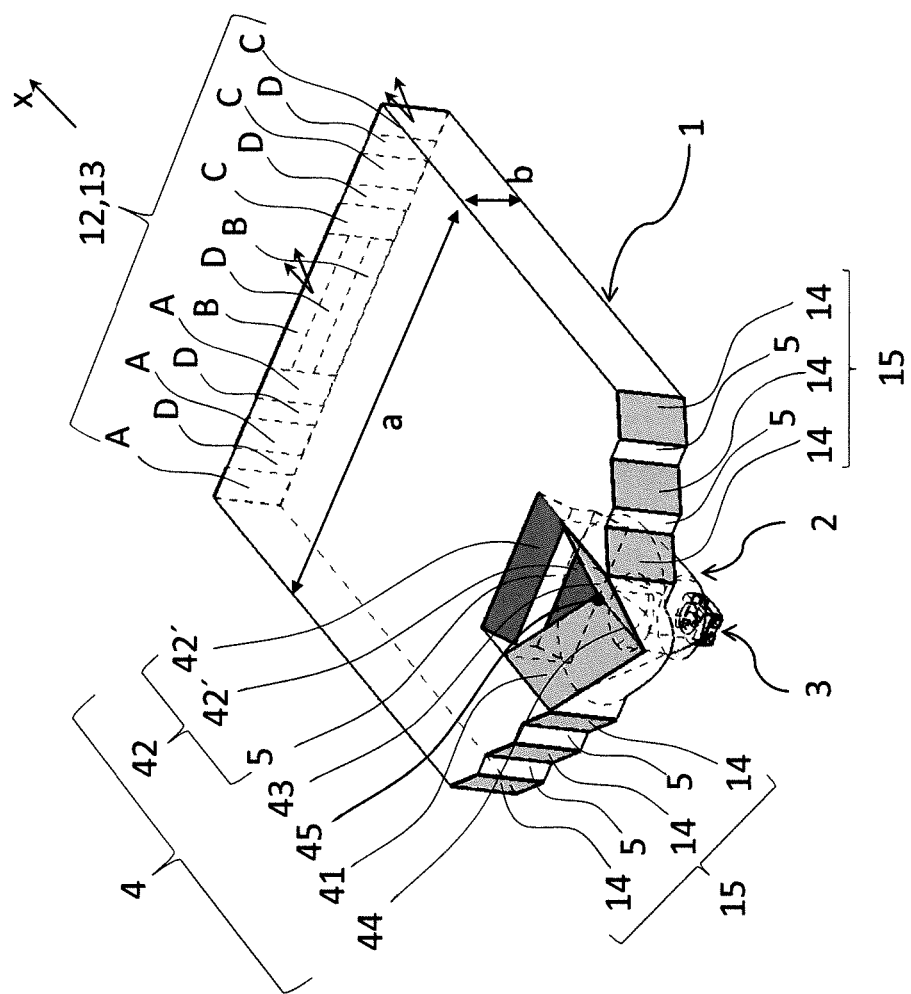
Figure 13:
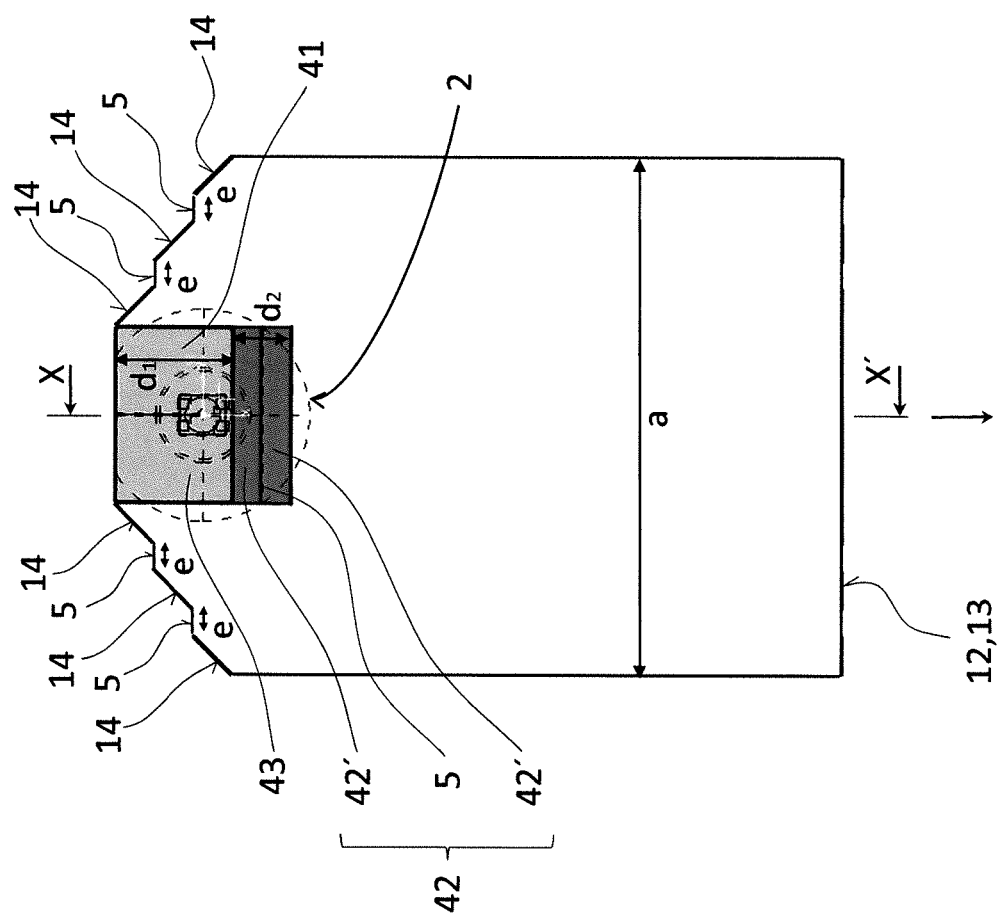
Figure 14:
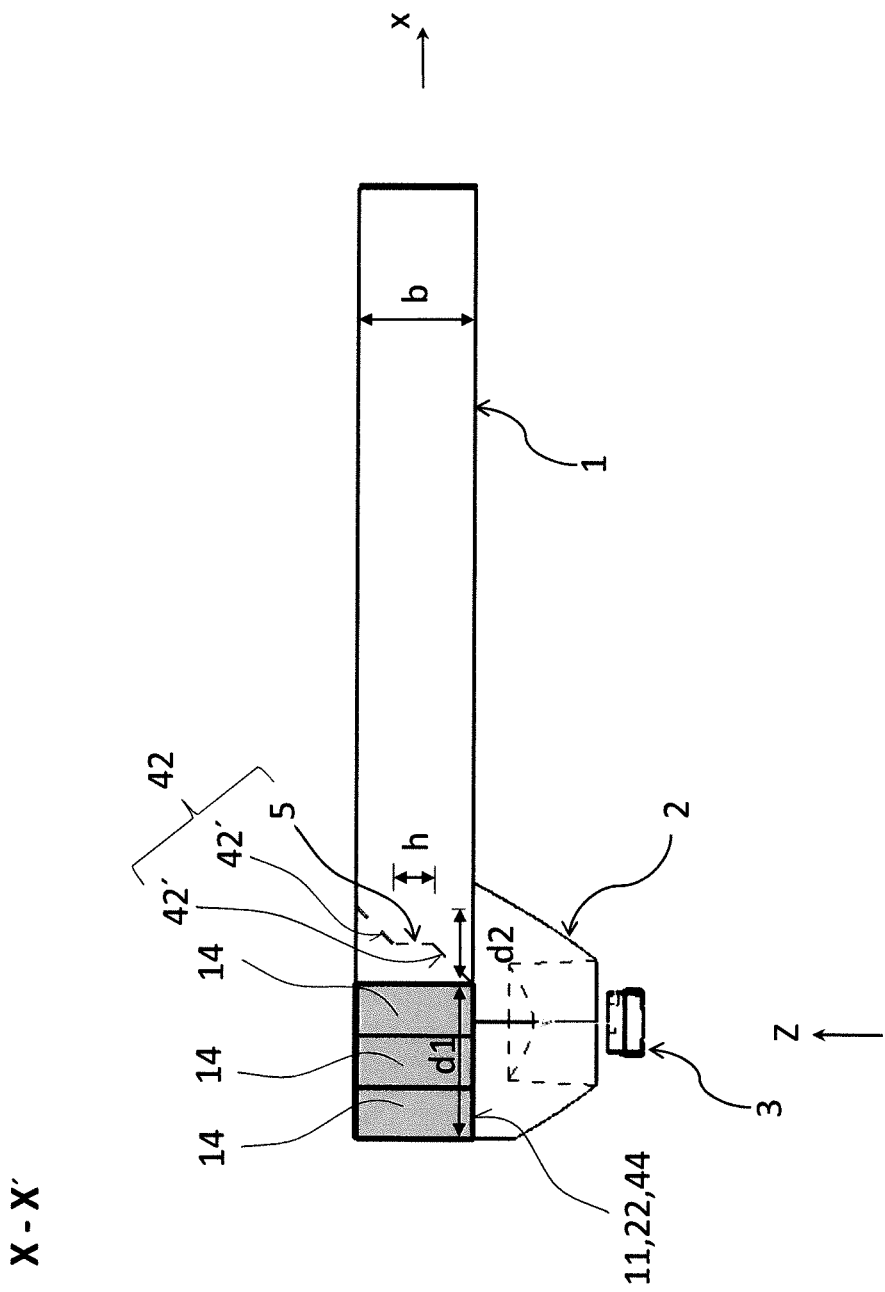
Figure 15:
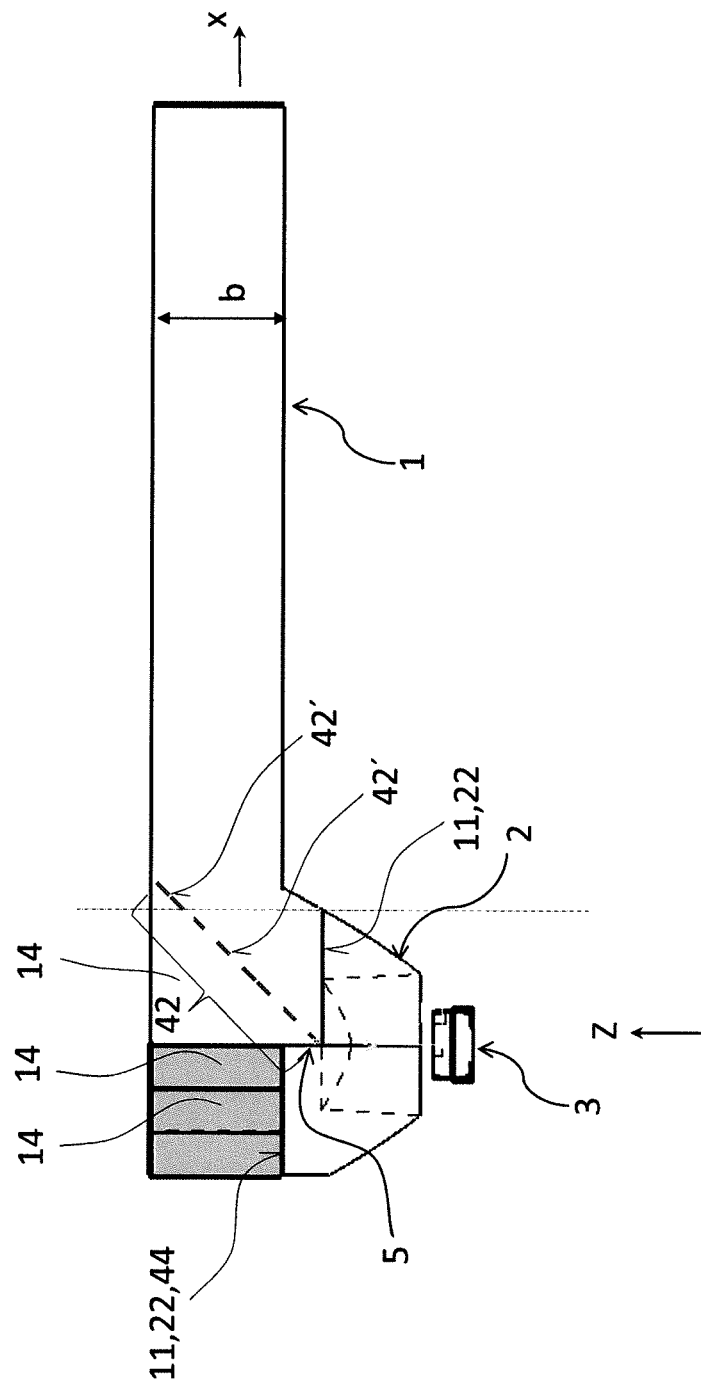
Figure 16:
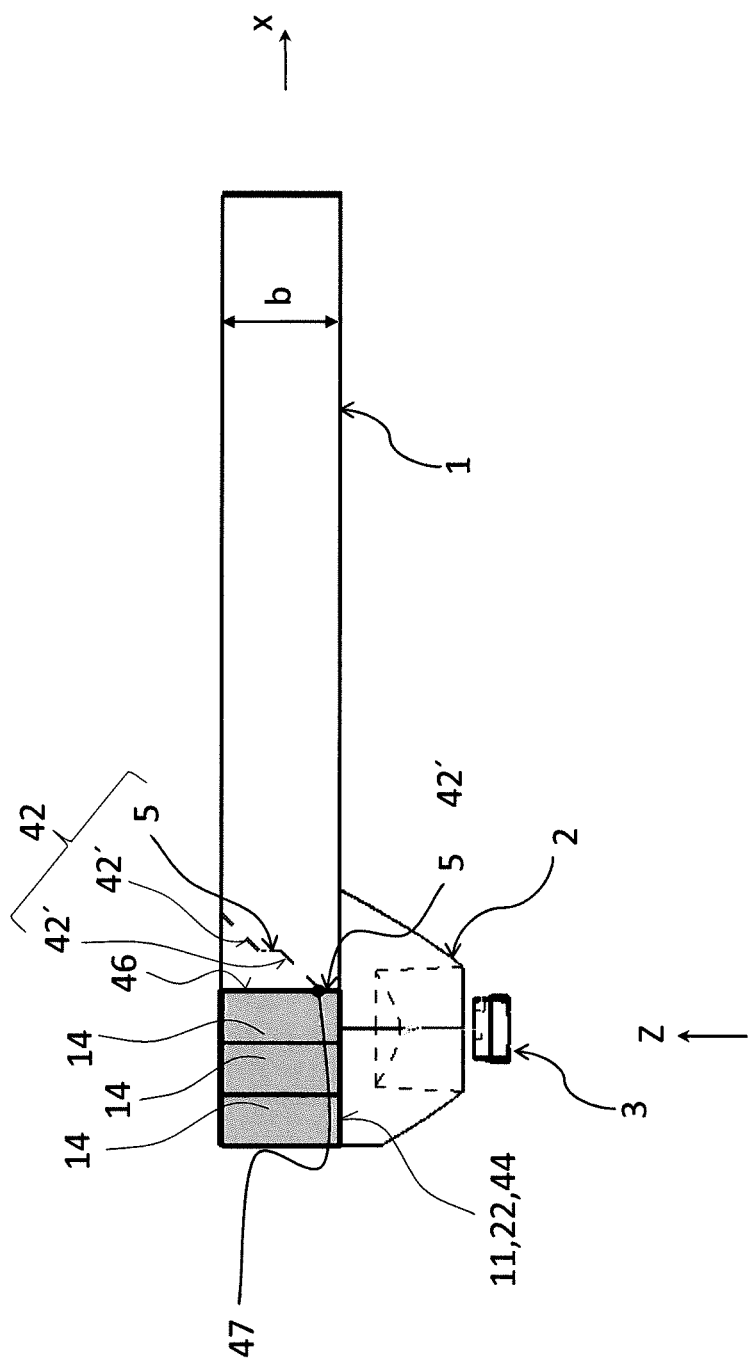
Figure 17:
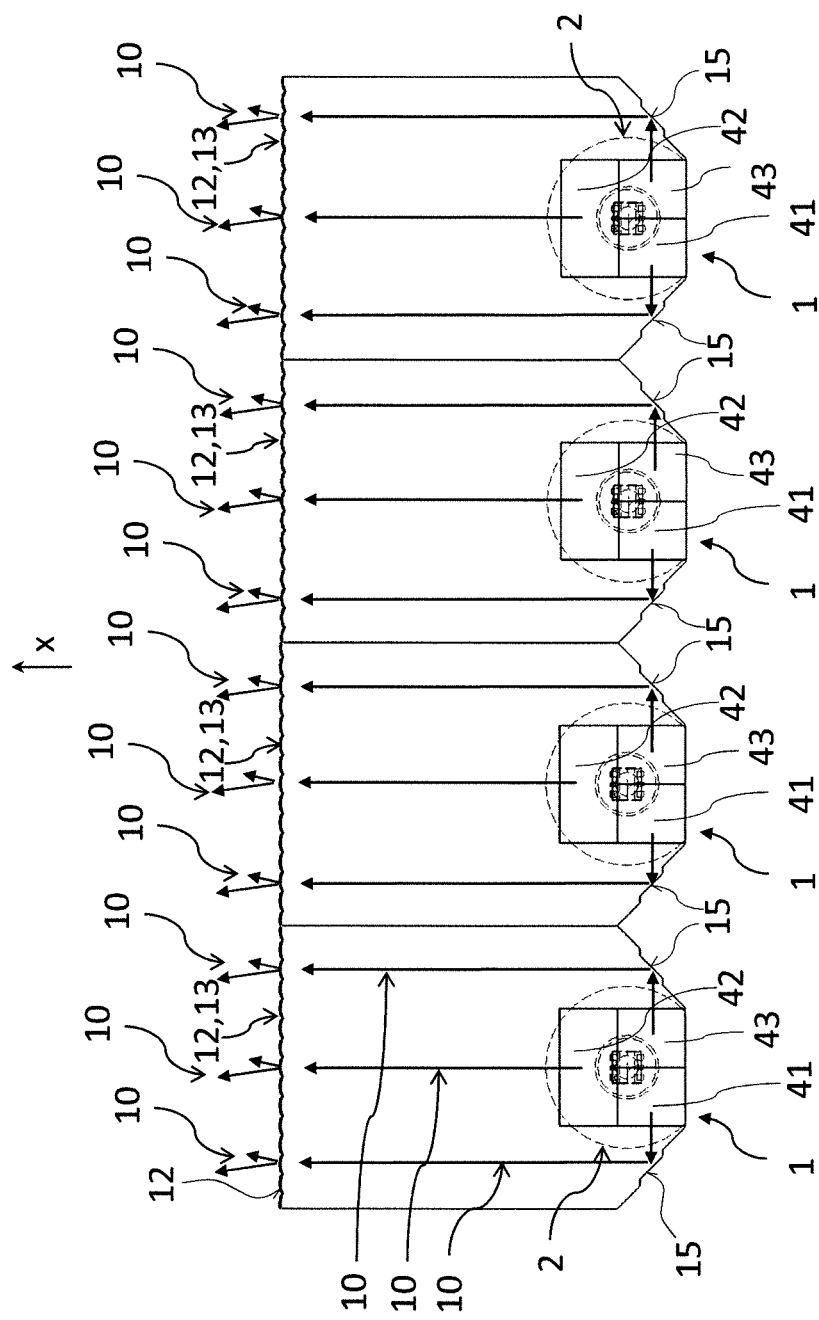
Figure 18:
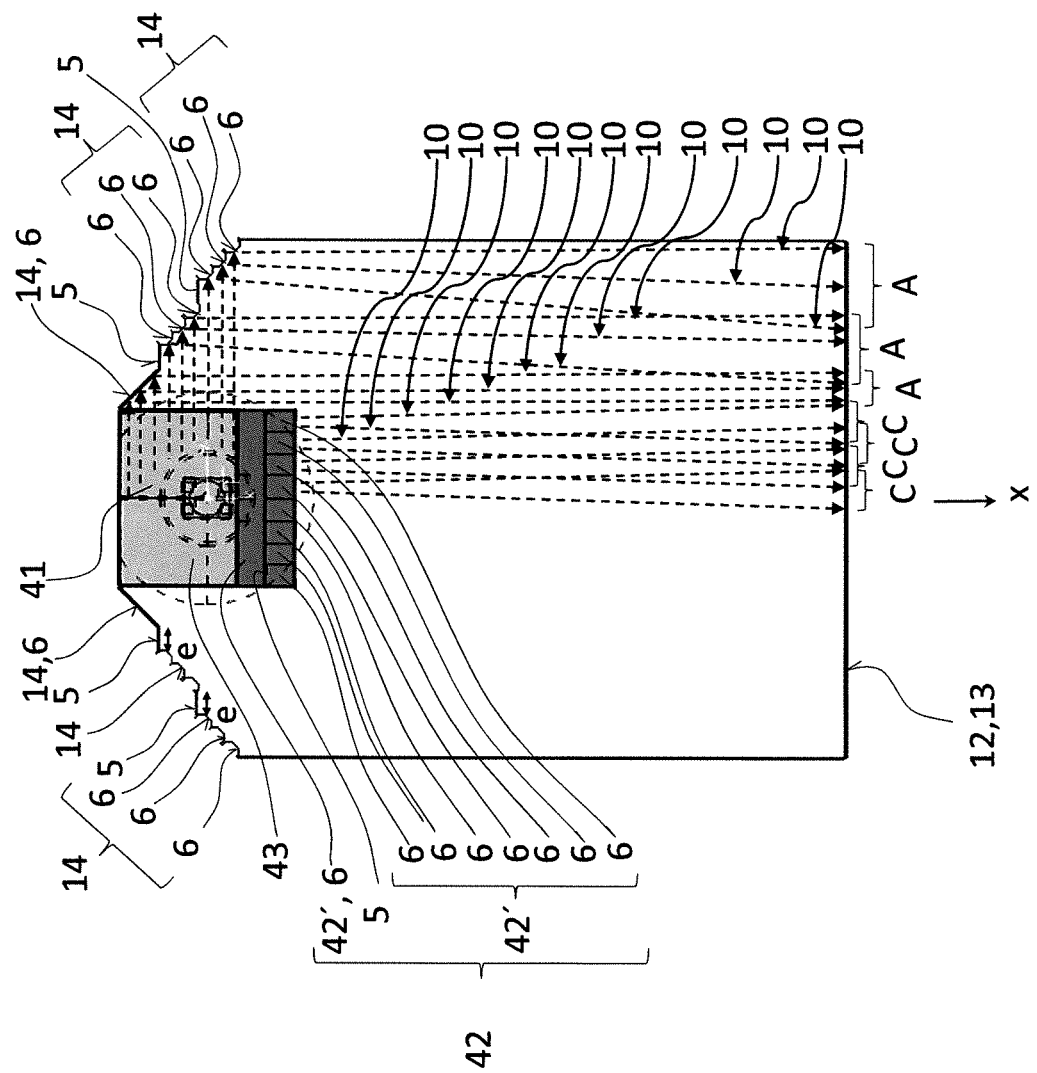

The present invention will be further clarified in more detail with the use of embodiment examples referring to the enclosed drawings where:

FIG. 1 shows a perspective top view of the rear side of a light-guiding optical system known from the prior art, FIG. 2 shows a view of the top side of the light-guiding optical system from FIG. 1, FIG. 3 shows a view in the longitudinal section X-X' of the light guiding system of FIG. 2, FIG. 4 shows a perspective top view of the rear side of the first embodiment example of a light-guiding optical system according to the invention, FIG. 5 shows a perspective top view of the front side of the light-guiding optical system of FIG. 4, FIG. 6 shows a view of the top side of the light-guiding optical system of FIG. 4, FIG. 7 shows a longitudinal section X-X' of the light-guiding optical system of FIG. 6, FIG. 8 shows a cross-section Y-Y' of the light-guiding optical system of FIG. 6, FIG. 9 shows a perspective top view of the rear side of the second embodiment example of a light-guiding optical system according to the invention, FIG. 10 shows a perspective bottom view of the front side of the third embodiment example of a light-guiding optical system according to the invention, FIG. 11 shows a perspective top view of the rear side of the fourth embodiment example of a light-guiding optical system according to the invention, FIG. 12 shows a perspective top view of the rear side of the fifth embodiment example of a light-guiding optical system according to the invention, FIG. 13 shows a view of the top side of the light-guiding optical system of FIG. 12, FIG. 14 shows a view in the longitudinal section X-X' of the light guiding system of FIG. 13, FIG. 15 shows a view in a longitudinal section of the sixth embodiment example of a light-guiding optical system according to the invention, FIG. 16 shows a view in a longitudinal section of the seventh embodiment example of a light-guiding optical system according to the invention, FIG. 17 shows a view of the top side of the eighth embodiment of a light-guiding optical system according to the invention, and FIG. 18 shows a view of the top side of the ninth embodiment of a light-guiding optical system according to the invention.

EXAMPLES OF EMBODIMENTS OF THE INVENTION

FIG. 1, FIG. 2 and FIG. 3 show the prior art wherein a lighting and/or signaling device for a motor vehicle comprises the light source 31 of a light unit 3 that is situated at the entry surface 21 of a collimating element 2 for entry of light rays 10 emitted by the source 31 into the collimating element 2. The collimating element 2 is further fitted with an output surface for the output of the collimated light beam into the light guide 1 body. The collimating element 2 is situated with respect to the light guide 1 plate in such a way that the collimated beam of light rays 10 can be directed to a reflective means 4 configure to direct rays 10 towards the output surface 12 of the light guide 1. The ground-plan projection of the reflective means 4 forms the binding surface 11 of the light guide 1 and its shape corresponds to the output surface 22 of the collimating element 2. The reflective means 4 consists of three inclined reflective surfaces 41, 42, 43 configured for total reflection of light rays 10 and to direct light rays towards the lateral surfaces 15 and towards the output surface 12 of the light guide 1 and the reflective surfaces 41, 42, 43 have the shape of a sector of a circle wherein two adjacent reflective surfaces have a common edge 44. Thus, the reflective means comprises three common edges 44. The shapes of the reflective surfaces create the shapes of patterns A, B, C projected on the output surface 12 of the light guide 1 directly and through reflection on the lateral walls 15.

FIGS. 4, 5, 6, 7 and 8 show the first embodiment example of a light guiding optical system according to the present invention, which comprises a planarly shaped light guide 1 having the shape of a plate and a collimating element 2 having the form of a rotary body. The light guide 1 and the collimating element 2 form an integral body that is made from an optically transparent material and is used to guide light rays 10 emitted by the light unit 3 comprising at least one light source 31, e.g. LED. The collimating element 2 is oriented with its entry surface 21 towards the light source 31 to bind light rays 10 that are emitted in the vertical direction, and with its output surface 22 it is oriented towards the binding surface 11 of the light guide 1 adapted to bind light rays 10 to the light guide 1 body. The outer jacket of the light guide 1 is fitted with a reflective means 4 to produce light patterns A, B, C on the output surface 12 of the light guide 1 while the patterns A, B, C are projected on the output surface 12 of the light guide 1 in such a way that they cover the entire output surface 12. The reflective means 4 comprises two lateral reflective surfaces 41, 43 intersecting each other at the contact edge 44 and one central surface 42, also reflective, touching the lateral reflective surfaces 41, 43 at the contact point 45, the lateral reflective surfaces 41, 43 being spatially offset from the central surface 42 by inactive surfaces 5. The central surface 42 is reflective all over its area, i.e. it does not comprise any inactive (i.e. non-reflective) surfaces, which means that it consists of one central reflective surface 42'. The surfaces 41, 42, 43 have the shape of a quadrangle to produce quadrangular patterns A, B, C on the output surface 12 of the light guide 1, the reflective surfaces 41, 43 being configured for total reflection of light rays 10 and routing them to the lateral surfaces 15 and the surface 42 being configured to reflect light rays 10 directly onto the output surface 12 of the light guide 1. The ground-plan projection of the reflective means 4 corresponds to the binding surface 11 situated on the bottom side of the light guide 1 and has the shape of a quadrangle or square (as a special case of a quadrangle) when the width c of the binding surface 11 and the reflective means 4 is preferably smaller than or equal to twice the length d of the binding surface 11 and reflective means 4. The edge of the output surface 22 of the collimating element 2 forms a circle which a quadrangle, preferably a square of the binding surface 11 created by the ground-plan projection of the reflective means 4 is inscribed or circumscribed in. The light guide 1 is fitted with reflective surfaces 14 at its lateral edges for total reflection and routing of a part of light rays 10 to the direction of the optical axis X. The light guide 1 further comprises an output surface 12 at its front edge for the output of light rays 10 conducted by the light guide 1 out of the light guide 1, the width a of the output surface 12 being preferably four times the height b of the output surface 12. On the output surface 12, patterns A, B, C are projected whose shape corresponds to the surfaces 41, 42, 43 of the reflective means 4.

As indicated in FIG. 7 and FIG. 8, the lateral reflective surfaces 41, 43 can be preferably inclined at the angle α amounting to 45°, have a common contact edge 44 and direct light rays 10 towards the lateral surfaces 15, which are fitted with reflective surfaces 14. The central surface 42 is also inclined at the angle α of 45° and it only gets in contact with the lateral reflective surfaces 41, 43 at the contact point 45.

As indicated in FIG. 8, the collimating element 2 comprises a central recess for efficient binding of light rays 10 from the light unit 3 to the body of the collimating element 2. One recess contains several binding surfaces 21 to bind most light rays 10 emitted by the light unit 3. The collimating element 2 comprises a central lens 23 to bind and direct emitted light rays 10 in a straight direction as well as lateral segments 24 to bind and direct emitted light rays 10 in an indirect direction. The lateral segments 24 comprise an entry surface 21 through which light rays 10 enter the body of the collimating element 2 as well as inner reflective collimating surfaces 25 configured for total reflection of bound light rays 10 and their emission to the desired direction. The shape of the inner reflective collimating surface 25 is preferably elliptical. Thus, the collimating element 2 has an ellipsoid-like shape, the output surface 22 having the shape of a circle or a sector of a circle.

FIG. 9 shows the second exemplary embodiment of a light-guiding optical system according to the invention whose collimating element 2 and light guide 1 do not form one integral body. The output surface 22 of the collimating element 2 is separated from the binding surface 11 of the light guide 1 by free space.

In the third example of an embodiment of a light guiding system according to the invention shown in FIG. 10, the output surface 12 of the light guide 1 is fitted with optical elements 13 for diffusion of light rays 10 from the axis X.

In the fourth example of an embodiment of a light-guiding system according to the invention shown in FIG. 11, the optical element 2 is implemented as a reflective surface, e.g. a reflector.

In the fifth exemplary embodiment of the light-guiding optical system in accordance with the invention shown in FIGS. 12, 13 and 14, the light guide 1 is fitted on its lateral surfaces 15 with several reflective surfaces 14 configured stepwise for total reflection and direction of bound light rays 10 to the direction of the optical axis x. Between the reflective surfaces 14, luminously inactive surfaces 5 are situated, producing inactive or luminously less active patterns D in the light trace. An inactive surface 5 is also situated in the reflexive means 4, namely between two stepwise configured central reflective surfaces 42', i.e. the central surface 42 consists of central reflective surfaces 42' and an inactive surface 5 situated between the central reflective surfaces 42'. The width a of the output surface 12 is preferably at least four times the height b of the output surface 12.

As indicated in FIG. 13, the length e of the inactive surfaces 5 on the lateral surface 15 of the light guide 1 can be used to variably adjust the width a and height b (shown in FIG. 14) of the light guide 1 within the design process for uniform distribution of the luminous flux among individual patterns A, B, C, D on the output surface (12). As shown in FIG. 14, on the one hand, within the design process, the height h of the inactive surfaces 5 in the reflective means 4 can be used to variably adjust the length d1 of the lateral reflective surfaces 41, 43 and the length d2 of the central surface 42, and on the other hand, the lengths d1, d2 can be changed by the height b of the light guide 1 for uniform distribution of the luminous flux among individual patterns A, B, C on the output surface 12.

In the sixth exemplary embodiment of the light-guiding optical system according to the invention shown in FIG. 15, the central surface 42 comprising the central reflective surfaces 42' reaches with its bottom edge under the contact edge 44 from which the lateral reflective surfaces 41, 43 stretch, so in this embodiment, the central surface does not touch the lateral reflective surfaces 41 and 43 at all.

In the seventh exemplary embodiment of the light-guiding optical system according to the invention shown in FIG. 16, the central surface 42 comprising the central reflective surfaces 42' reaches with its bottom edge over the contact edge 44 from which the lateral reflective surfaces 41, 43 stretch, so in this embodiment, the central surface touches the lateral reflective surfaces 41 and 43 on their marginal edges 46 at a separate contact point 47.

As indicated in FIG. 17, showing the eighth exemplary embodiment of a light-guiding optical system according to the invention, individual light guides 1 can be situated next to each other and made as an integral molding to produce a continuous output surface 12 of light rays 10. Light rays 10 are sent to the output surface 12 via multiple reflective means 4 situated at the optical elements 2. Light rays 10 can be sent to the output surface 12 indirectly by means of the lateral reflective surfaces 41, 43 of the reflective means 4, as well as directly by means of the central reflective surfaces 42 of the reflective means 4.

As indicated in FIG. 18, showing the ninth exemplary embodiment of the light-guiding optical system according to the invention, the reflective surface 14 and/or the central reflective surface 42' may comprise a diffusion element 6 and/or an array of diffusion elements 6. The diffusion element 6 is designed e.g. as a part of a cylindrical surface or an elliptical surface or a broken surface or a diffusion surface. Light rays 10 are sent to the output surface 12 via the diffusion element 6 in a diffusing way for partial overlapping of individual patterns A, B, C on the output surface 12 of the light guide 1 and/or to eliminate the area of the inactive pattern D.

LIST OF REFERENCE MARKS

1—light guide
11—binding surface
12—output surface
13—optical element
14—reflective surface
15—lateral surface
2—collimating element
21—entry surface
22—output surface
23—central lens
24—lateral segment
25—inner reflective collimating surface
3—light unit
31—light source
4—reflective means
41—lateral reflective surface
42—central surface
42'—central reflective surface
43—lateral reflective surface
44—contact edge
45—common contact point
46—marginal edge
47—contact point
5—inactive surface
6—diffusion element
10—light ray
A—pattern
B—pattern
C—pattern
D—pattern
a—width
b—height
c—width
d, d1, d2, e—length
h—height
X, Y, Z—axes of the Cartesian coordinate system
x—optical axis

The invention claimed is:

1. A light-guiding optical system comprising at least one light guide made from an optically transparent material with collimating element and a light unit to emit light rays into the collimating element,
    wherein the light guide comprises a front side, a bottom side, a top side, and external lateral surfaces,
    wherein the front side comprises an output surface for the output of the light rays conducted by the light guide out of the light guide,
    wherein the top side or bottom side comprise a binding surface to bind the light rays collimated by the collimating element into the light guide,
    wherein the light guide comprises reflective means to produce light patterns on the output surface that comprises two lateral reflective surfaces and a central surface,
    wherein the two lateral reflective surfaces and the central surface are configured for total reflection of a part of the light rays bound by the binding surface,
    wherein a portion of the light rays are reflected by the two lateral reflective surfaces onto the external lateral surfaces and another portion of the light rays are reflected by the central surface straight to the output surface of the light guide,
    wherein the two lateral reflective surfaces open from a common contact edge, along which the two lateral reflective surfaces are joined,
    wherein the central surface touches one of the two lateral reflective surfaces at a first contact point that lies on a marginal edge of the one of the two lateral reflective surfaces, and the other one of the two lateral reflective surfaces at a second contact point that lies on a marginal edge of the other of the two lateral reflective surfaces, the first and second contact points being different.

2. The light-guiding optical system according to claim 1, wherein the central surface comprises one or more central reflective surfaces, wherein the two lateral reflective surfaces and/or the central reflective surfaces have the shape of a quadrangle to produce quadrangular patterns on the output surface of the light guide.

3. The light-guiding optical system according claim 2, wherein the two lateral reflective surfaces and/or the central reflective surfaces have the shape of a rectangle to produce rectangular patterns on the output surface of the light guide.

4. The light-guiding optical system according claim 3, wherein a projection of the two lateral reflective surfaces and the central surface onto a plane parallel to the top or bottom side of the light guide produces a full rectangle together.

5. The light-guiding optical system according to claim 1, wherein the light patterns projected onto the output surface of the light guide cover the whole output surface.

6. The light-guiding optical system according to claim 1, wherein the external lateral surfaces of the light guide comprise stepwise arranged reflective surfaces configured for total reflection and direction of the light rays onto the output surface in the direction of an optical axis (x).

7. The light-guiding optical system according claim 6, wherein luminously inactive surfaces are situated between the reflective surfaces, creating inactive, or compared to the light patterns, luminously less active patterns.

8. The light-guiding optical system according to claim 1, wherein the central surface comprises at least one inactive surface.

9. The light-guiding optical system according claim 8, wherein the central surface comprises the central reflective surfaces and the at least one inactive surface being situated between each adjacent pair of the central reflective surfaces of the central surface.

10. The light-guiding optical system according to claim 1, wherein the output surface of the light guide is fitted with optical elements for diffusion of the light rays exiting from the light guide from an axis (x).

11. The light-guiding optical system according to claim 1, wherein the light guide and the collimating element form an integral body.

12. The light-guiding optical system according to claim 1, wherein the light guide and the collimating element are individual, spatially separated bodies.

13. The light-guiding optical system according to claim 1, wherein the collimating element is a reflector.

14. The light-guiding optical system according to claim 1, wherein the reflective means is symmetrical with respect to the plane perpendicular to the top or bottom side of the light guide and comprising the contact edge.

15. The light-guiding optical system according to claim 1, wherein the light guide is symmetrical with respect to the plane perpendicular to the top or bottom side of the light guide and comprising the contact edge.

16. The light-guiding optical system according to claim 1, wherein the two lateral reflective surfaces and planes that the central reflective surfaces lie on make an angle of 45° with the bottom or top side of the light guide and the light rays exiting from the collimating element also fall onto the two lateral reflective surfaces and the central reflective surfaces at the angle of 45°.

17. The light-guiding optical system according to claim 1, further comprising at least two light guides situated next to each other, produced together as one integral molding to create a continuous composite output surface comprising the output surfaces of individual light guides positioned next to each other, for the output of light rays from the lightguiding optical system.

18. The light-guiding optical system according to claim 1, wherein the reflective surface comprises at least one diffusion element for partial overlapping of individual patterns on the output surface of the light guide and/or to eliminate the inactive patterns on the output surface of the light guide.

19. The light-guiding optical system according to claim 1, wherein the central reflective surfaces comprise at least one diffusion element for partial overlapping of individual patterns on the output surface of the light guide and/or to eliminate the inactive patterns on the output surface of the light guide.

20. A light-guiding optical system comprising at least one light guide made from an optically transparent material with collimating element and a light unit to emit light rays into the collimating element,
    wherein the light guide comprises a front side, a bottom side, a top side, and external lateral surfaces,
    wherein the front side comprises an output surface for the output of the light rays conducted by the light guide out of the light guide,
    wherein the top side or bottom side comprise a binding surface to bind the light rays collimated by the collimating element into the light guide,
    wherein the light guide comprises reflective means to produce light patterns on the output surface that comprises two lateral reflective surfaces and a central surface, wherein the two lateral reflective surfaces and the central surface are configured for total reflection of a part of the light rays bound by the binding surface, wherein a portion of the light rays are reflected by the two lateral reflective surfaces onto the external lateral surfaces and another portion of the light rays are reflected by the central surface straight to the output surface of the light guide, wherein the two lateral reflective surfaces open from a common contact edge, along which the two lateral reflective surfaces are joined, wherein the central surface either:
  (i) does not touch any of the two lateral reflective surfaces, or
  (ii) touches one of the two lateral reflective surfaces at a first contact point that lies on a marginal edge of the one of the two lateral reflective surfaces, and the other of the two lateral reflective surfaces at a second contact point that lies on a marginal edge of the other of the two lateral reflective surfaces, the first and second contact points being either (a) different, or (b) identical and lying at the end of the common contact edge;

wherein the two lateral reflective surfaces and the central reflective surfaces are planar and make an angle of 45° with the bottom or top side of the light guide and the light rays exiting from the collimating element also fall onto the two lateral reflective surfaces and the central reflective surfaces at the angle of 45°.

21. A light-guiding optical system comprising at least one light guide made from an optically transparent material with collimating element and a light unit to emit light rays into the collimating element, wherein the light guide comprises a front side, a bottom side, a top side, and external lateral surfaces, wherein the front side comprises an output surface for the output of the light rays conducted by the light guide Out of the light guide, wherein the top side or bottom side comprise a binding surface to bind the light rays collimated by the collimating element into the light guide, wherein the light guide comprises reflective means to produce light patterns on the output surface that comprises two lateral reflective surfaces and a central surface, wherein the two lateral reflective surfaces and the central surface are configured for total reflection of a part of the light rays bound by the binding surface, wherein a portion of the light rays are reflected by the two lateral reflective surfaces onto the external lateral surfaces and another portion of the light rays are reflected by the central surface straight to the output surface of the light guide, wherein the two lateral reflective surfaces open from a common contact edge, along which the two lateral reflective surfaces are joined, wherein the central surface either:
  (i) does not touch any of the two lateral reflective surfaces, or
  (ii) touches one of the two lateral reflective surfaces at a first contact point that lies on a marginal edge of the one of the two lateral reflective surfaces, and the other of the two lateral reflective surfaces at a second contact point that lies on a marginal edge of the other of the two lateral reflective surfaces, the first and second contact points being either (a) different, or (b) identical and lying at the end of the common contact edge;

wherein the central surface comprises central reflective surfaces and at least one inactive surface being situated between the central reflective surfaces of the central surface.

* * * * *